United States Patent [19]

Sunagawa et al.

[11] Patent Number: 4,738,501
[45] Date of Patent: Apr. 19, 1988

[54] LIGHT BEAM SCANNING APPARATUS, AND READ-OUT APPARATUS AND RECORDING APPARATUS USING SAME

[75] Inventors: Hiroshi Sunagawa; Nobuharu Nozaki; Jin Murayama; Yoji Okazaki; Toshio Iijima, all of Kaisei, Japan

[73] Assignee: Fuji Photo Film Co., Ltd., Minamiashigara, Japan

[21] Appl. No.: 849,447

[22] Filed: Apr. 8, 1986

[30] Foreign Application Priority Data

| Apr. 8, 1985 [JP] | Japan | 60-74064 |
| Apr. 8, 1985 [JP] | Japan | 60-74065 |
| Apr. 8, 1985 [JP] | Japan | 60-74066 |
| Oct. 11, 1985 [JP] | Japan | 60-226059 |

[51] Int. Cl.$^4$ .............................................. G02F 1/33
[52] U.S. Cl. .............................. 350/96.13; 350/96.14
[58] Field of Search ............... 350/96.13, 96.11, 96.12, 350/96.14

[56] References Cited

U.S. PATENT DOCUMENTS

| 4,054,362 | 10/1977 | Baues | 350/96.14 |
| 4,094,606 | 6/1978 | Camphausen | 350/96.14 X |
| 4,372,641 | 2/1983 | Johnson et al. | 350/96.12 |
| 4,523,803 | 6/1985 | Arao et al. | 350/96.13 |

OTHER PUBLICATIONS

"Integrated Optical Acousto-Optical Switching", Ralf Th. Kersten, *Integrated Optical Circuit Engineering*, SPIE, vol. 517, 10-1984, pp. 258-266.

Primary Examiner—John Lee
Assistant Examiner—Michael Menz
Attorney, Agent, or Firm—Fleit, Jacobson, Cohn & Price

[57] ABSTRACT

A light beam scanning system comprises a wave guide formed of a material allowing propagation of surface acoustic waves therethrough, and a means for generating the surface acoustic waves in the wave guide so that they advance along an optical path of light incident upon the wave guide, and a drive circuit for periodically applying a pulsewise voltage to the surface acoustic wave generating means. The wave guided inside of the wave guide is emitted out of the wave guide at the section where the surface acoustic waves are present by a coupling action of a grating generated by the surface acoustic waves with the guided wave.

20 Claims, 3 Drawing Sheets

LIGHT BEAM SCANNING APPARATUS, AND READ-OUT APPARATUS AND RECORDING APPARATUS USING SAME

BACKGROUND OF THE INVENTION

1. Field of the Invention

This invention relates to a light beam scanning apparatus, a light beam scanning read-out apparatus, and a light beam scanning recording apparatus. This invention particularly relates to a light beam scanning apparatus, a light beam scanning read-out apparatus, and a light beam scanning recording apparatus wherein light beam scanning is conducted by generating a surface acoustic wave in a wave guide and utilizing the coupling action of a grating generated by the surface acoustic wave with guided wave.

2. Description of the Prior Art

Light beam scanning type recording apparatuses and read-out apparatuses have heretofore been used widely. As the light beam scanning apparatuses for one-dimensionally scanning a recording light beam or a reading light beam in the recording apparatuses and the read-out apparatuses, those as described below are known. (1) Apparatuses wherein the light beam is deflected and scanned by a mechanical type light deflector such as a galvanometer mirror or a polygon mirror (multi-face rotating mirror). (2) Apparatuses wherein the light beam is deflected and scanned by a light deflector using solid-state light deflecting device, such as an EOD (electro-optic deflector) or an AOD (acousto-optic deflector). (3) Apparatuses wherein a shutter array such as a liquid crystal device array or a PLZT array is combined with a linear light source, the shutter devices of the shutter array are independently connected to drive circuits and turned on and off in accordance with an image signal to conduct linear sequential scanning. (4) Apparatuses wherein many light emitting devices such as LEDs are arrayed in a line, independently connected to drive circuits, and turned on and off in accordance with an image signal to conduct linear sequential scanning.

The light beam scanning apparatuses described in (1) have the drawbacks that the mechanical type light deflector is weak against vibration, exhibits low mechanical durability, and requires troublesome adjustments. Further, a large optical system is necessary for swinging and deflecting the light beam, and the recording apparatuses and the read-out apparatuses become large.

The light beam scanning apparatuses described in (2) and using the EOD or AOD have the same drawback that the apparatuses become large to swing and deflect the light beam. Particularly, since the light deflection angle cannot be adjusted large with the EOD and AOD, the optical system becomes larger than in the case where the mechanical light deflector is used as described in (1).

In the light beam scanning apparatuses using the shutter array as described in (3), since two polarizing plates must be used, the light utilization efficiency of the light source is very low.

The light beam scanning apparatuses using many light emitting devices arrayed in a line as described in (4) have the drawback that, since fluctuations arise in light emission intensity between the light emitting devices, the apparatuses are not suitable for accurate scanning.

SUMMARY OF THE INVENTION

The primary object of the present invention is to provide a light beam scanning apparatus which exhibits high durability, vibration resistance and light utilization efficiency, and which is easy to adjust, suitable for accurate scanning, and small in size.

Another object of the present invention is to provide a light beam scanning read-out apparatus which exhibits high durability, vibration resistance and light utilization efficiency, and which is easy to adjust, suitable for accurate scanning, and small in size.

A further object of the present invention is to provide a light beam scanning recording apparatus which exhibits high durability, vibration resistance and light utilization efficiency, and which is easy to adjust, suitable for accurate scanning, and small in size.

The present invention provides a light beam scanning apparatus which comprises:

(i) a wave guide formed of a material allowing propagation of surface acoustic waves therethrough, (ii) a means for generating the surface acoustic waves in said wave guide so that they advance along an optical path of light incident upon said wave guide, and (iii) a drive circuit for periodically applying a pulsewise voltage to said surface acoustic wave generating means, whereby the wave guided inside of said wave guide is radiated out of said wave guide at the section where said surface acoustic waves are present by a coupling action of a grating generated by said surface acoustic waves with the guided wave.

The present invention also provides a light beam scanning read-out apparatus which comprises:

(i) a wave guide formed of a material allowing propagation of surface acoustic waves therethrough, (ii) a light source for emitting light into said wave guide, (iii) a means for generating the surface acoustic waves in said wave guide so that they advance along an optical path of the wave inside of said wave guide, (iv) a drive circuit for periodically applying a pulsewise voltage to said furface acoustic wave generating means, (v) a sub-scanning means for moving a read-out original, which is positioned so that the light radiated out of said wave guide by a coupling action of a grating generated by said surface acoustic waves with the wave guided inside of said wave guide impinges upon said read-out original, with respect to said wave guide in a direction approximately normal to the advance direction of said surface acoustic waves, and (vi) a photodetector for photoelectrically detecting light transmitting through said original, light reflected by said original, or light radiated by said original when said light radiated out of said stack impinges upon said original.

The present invention further provides a light beam scanning recording apparatus which comprises:

(i) a wave guide formed of a material allowing propagation of surface acoustic waves therethrough, (ii) a light source for emitting light into said wave guide, (iii) a means for generating the surface acoustic waves in said wave guide so that they advance along an optical path of the wave inside of said wave guide, (iv) a drive circuit for periodically applying a pulsewise voltage to said surface acoustic wave generating means, (v) a sub-scanning means for moving a light-sensitive material, which is positioned so that the wave radiated out of said wave guide by a coupling action of a grating generated by said surface acoustic waves with the wave guided inside of said wave guide impinges upon said read-out original, with respect to said wave guide in a direction approximately normal to the advance direction of said surface acoustic waves, and (vi) a modulation means for modulating said light incident upon said wave guide from said light source in accordance with an image signal.

The grating generated by the surface acoustic waves is obtained based on a periodic configuration of change in refractive index caused by the photoelastic effect of the surface acoustic waves, a periodic configuration of geometric deformation of the wave guide surface contacting the air layer, or a periodic configuration of change in refractive index caused by the photoelastic effect (generated by an electric field caused by the piezo-electric effect) in the case of a ferroelectric material, or a combination of these periodic configurations. Since the position at which the light is radiated out of the wave guide from the section of the surface acoustic waves changes as the surface acoustic waves advance, the light radiated out of the wave guide is scanned in one direction.

In the present invention, since a single light source is used, the problem of fluctuations in light emission intensity of the light source as in the case of the LED array or the like, and it is possible to conduct scanning accurately and to improve the light utilization efficiency of the light source. Further, since no mechanical operating section is used, the apparatus exhibits high durability and high resistance to vibration, and is easy to adjust. Also, since scanning can be conducted without greatly swinging the light beam, it becomes possible to prevent the light beam scanning system from becoming large.

DESCRIPTION OF THE PREFERRED EMBODIMENTS

The present invention will hereinbelow be described in further detail with reference to the accompanying drawings.

Figure 1:
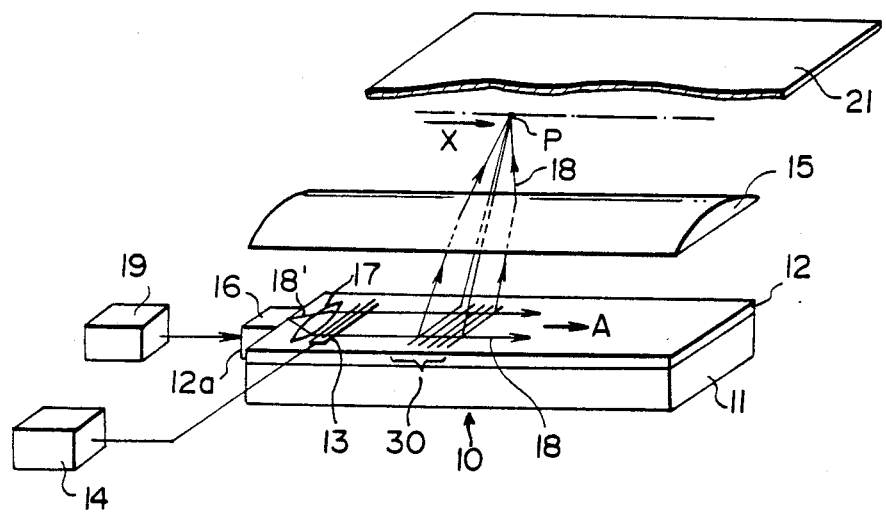
FIG. 1 is a schematic view showing an embodiment of the light beam scanning apparatus in accordance with the present invention.

Referring to FIG. 1, a light beam scanning apparatus 10 comprises an elongated substrate 11, a wave guide 12 formed on the substrate 11, an inter digital transducer 13 positioned at one end portion inside of the wave guide 12, a drive circuit 14 for applying a voltage to the inter digital transducer 13, and a cylindrical lens 15 positioned above the wave guide 12. In this embodiment, by way of example, the substrate 11 is formed of a LiNbO$_3$ wafer, and the wave guide 12 is formed by overlaying a Ti diffusion film on the surface of the wafer. As the substrate 11, it is also possible to use a crystal substrate formed of sapphire, Si or the like. The wave guide 12 may also be formed by sputtering or depositing a different material onto the surface of the substrate 11. The wave guide configuration is described in detail, for example, in T. Tamir, "Integrated Optics," Topics in Applied Physics, Vol. 7, Springer-Verlag, 1975, and Nishibara, et al., "Integrated Optical Circuit," ohm, 1985. In the present invention, any of the known wave guide configurations may be used as the wave guide 12. However, the wave guide 12 must be formed of a material such as the Ti diffusion film allowing propagation of surface acoustic waves. The wave guide 12 may also be constituted by two or more layers.

The end face of the wave guide 12 on the side where the inter digital transducer 13 is positioned is formed as a light input face 12a on which a semiconductor laser 16 for emitting a laser beam 18' toward the wave guide 12 is directly secured. The wave guide 12 is provided with a wave guide lens 17 in the vicinity of the semiconductor laser 16. The laser beam 18' emitted by the semiconductor laser 16 is converted into a laser beam 18 of parallel rays by the wave guide lens 17. The laser beam 18 advances in the guided mode in the direction as indicated by the arrow A inside of the wave guide 12. Instead of directly securing the semiconductor laser 16 to the light input face 12a, the laser beam may be made to impinge upon the wave guide 12 via a lens, a coupler prims, a grating coupler or the like. The light source for emitting the scanning light is not limited to the semiconductor laser 16, and may be a gas laser, a solid laser or the like.

When light beam scanning is conducted, the semiconductor laser 16 is operated by the drive circuit 19. On the other hand, a predetermined pulsewise voltage is periodically applied by the drive circuit 14 to the inter digital transducer 13. When the pulsewise voltage is applied to the inter digital transducer 13, surface acoustic waves 13 are generated at the wave guide 12, propagate along the surface of the wave guide 12, and advance in the direction as indicated by the arrow A in parallel with the laser beam 18. When the surface acoustic waves 30 are generated, a grating is obtained by the photoelastic effect of the surface acoustic waves 30, geometric deformation of the surface of the wave guide 12 contacting the air layer, the electro-optic effect caused by the piezo-electric effect, or a combination thereof. By the coupling action with the grating, the laser beam 18 guided inside of the wave guide 12 is radiated out of the wave guide 12 at the section corresponding to the surface acoustic waves 30. In this embodiment, the drive circuit 14 applies the voltage to the inter digital transducer 13 so that the respective surface acoustic waves 30 sequentially change their frequency and a group of the surface acoustic waves 30 of the chirped period are obtained. The laser beam 18 radiated out of the group of the surface acoustic waves of the chirped period is converged forwardly and rearwardly in the advance direction of the surface acoustic waves 30. The converged laser beam 18 is then further converged by the cylindrical lens 15 in the direction normal to the aforesaid converging direction. As a result, the laser beam 18 is converted to a single spot P. Since the position of radiation of the converged laser beam 18 out of the wave guide 12 moves as the surface acoustic waves 30 advance, the spot P at which the laser beam 18 is converged also moves in the direction as indicated by the arrow X parallel to the advance direction of the surface acoustic waves 30 as indicated by the arrow A, thereby one-dimensionally scanning a scanning material 21 in the main scanning direction. The scanning material 21 is then moved in the sub-scanning direction as indicated by the arrow Y, and the aforesaid operation is repeated to scan the scanning material 21 in two directions.

In the aforesaid embodiment, the end face on the side of the wave guide 12 where the inter digital transducer 13 is positioned is formed as the light input face 12a, and the surface acoustic waves 30 advance in the advance direction of the laser beam 18 guided inside of the wave guide 12. However, it is also possible to form the end face opposite to the inter digital transducer 13 as the light input face, or to position the inter digital transducer 13 at the end portion opposite to the light input face 12a, so that the surface acoustic waves 30 advance reversely to the advance direction of the laser beam 18. In any case, the laser beam 18 is radiated out of the wave guide 12 insofar as at least a part of the surface acoustic waves 30 advances along the optical path of the laser beam 18.

Further, in the aforesaid embodiment, the surface acoustic waves 30 are of the chirped period. However, it is also possible to generate a group of surface acoustic waves of a single period as the surface acoustic waves 30. Since the grating can be obtained even with such surface acoustic waves, it is possible to make the light advancing inside of the wave guide 12 radiate out of the wave guide 12. When the surface acoustic waves of a single period are used, since the aforesaid converging action is not obtained, a lens array such as a SELFOC lens array, a converging optical system comprising small convex lenses arrayed in a line over the light beam scanning section, or a converging optical system comprising distributed index lenses arrayed in a line should be used instead of the cylindrical lens 15. In the case where the substrate 11 and the wave guide 12 are made of a piezo-electric material, the surface acoustic waves 30 may be generated also when the inter digital transducer 13 is directly positioned inside of the wave guide 12 or on the substrate 11. In other cases, a piezo-electric thin film of ZnO or the like may be formed at a part of the substrate 11 or the wave guide 12 by deposition, sputtering, or the like, and the inter digital transducer 13 may be positioned at the piezo-electric thin film. The semiconductor laser 16 may also be formed integrally with the wave guide 12.

FIGS. 2 to 5 show the major parts of further embodiments of the light beam scanning apparatus in accordance with the present invention, wherein the end face of the wave guide 12 opposite to the input face 12a thereof is subjected to a return light generation preventing processing.

Figure 2:
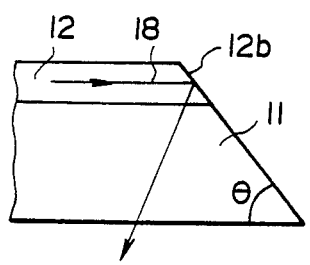
FIGS. 2 to 5 are side views showing the major parts of further embodiments of the light beam scanning apparatus in accordance with the present invention.

In FIG. 2, an end face 12b opposite to the input face 12a of the wave guide 12 is cut obliquely so that the laser beam 18 guided inside of the wave guide 12 is reflected downwardly by the end face 12b, impinges upon the substrate 11 at a relatively small angle of incidence, and is radiated out of the substrate 11. Since total reflection does not arise at the boundary between the wave guide 12 and the substrate 11, the laser beam 18 reflected by the end face 12b does not return inside of the wave guide 12 toward the input face 12a thereof.

Accordingly, no multiple reflection arises between the laser beam 18 emitted by the semiconductor laser 16 as shown in FIG. 1 and guided inside of the wave guide 12 and a return laser beam, and no noise is generated by the multiple reflection in the scanning laser beam 18 emitted out of the wave guide 12. Further, generation of noise in the semiconductor laser 16 by such return laser beam is prevented, and the service life of the semiconductor laser 16 becomes long since there is no risk of the semiconductor laser 16 damaged by the return laser beam.

Though the total reflection conditions at the boundary between the wave guide 12 and the substrate 11 are different in accordance with the configuration (refractive index and thickness) of the wave guide 12, the refractive index of the substrate 11, the order of guided mode, or the like, the oblique cutting angle $\theta$ of the end face 12b as shown in FIG. 2 may generally be adjusted to approximately 45°.

Figure 3:
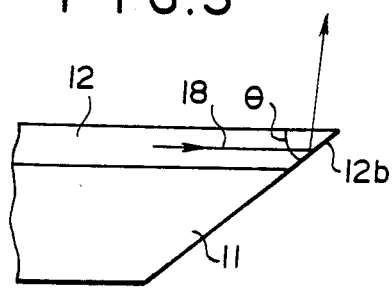

In the embodiment of FIG. 3, the end face 12b of the wave guide 12 is obliquely cut in the direction opposite to that in FIG. 2. In this case, since the laser beam 18 reflected by the end face 12b advances in the same direction as the scanning laser beam, the cutting angle $\theta$ should be adjusted so that the reflected laser beam 18 does not impinge upon the scanning material 21 shown in FIG. 1, or a light shielding material should be positioned between the scanning material 21 and the wave guide 12.

Figure 4:
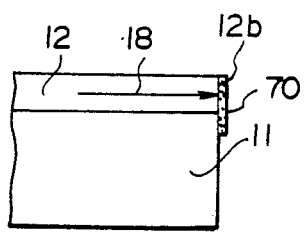
Figure 5:
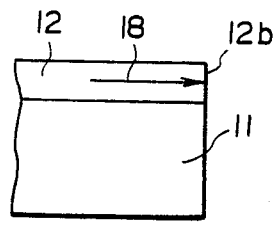

Generation of return light may also be prevented by securing a light absorbing material 70 to the end face 12b as shown in FIG. 4, by coating a light reflection preventing layer on the end face 12b, or by roughing the end face 12b as shown in FIG. 5 so that the guided wave is scattered at the end face 12b.

Figure 6:
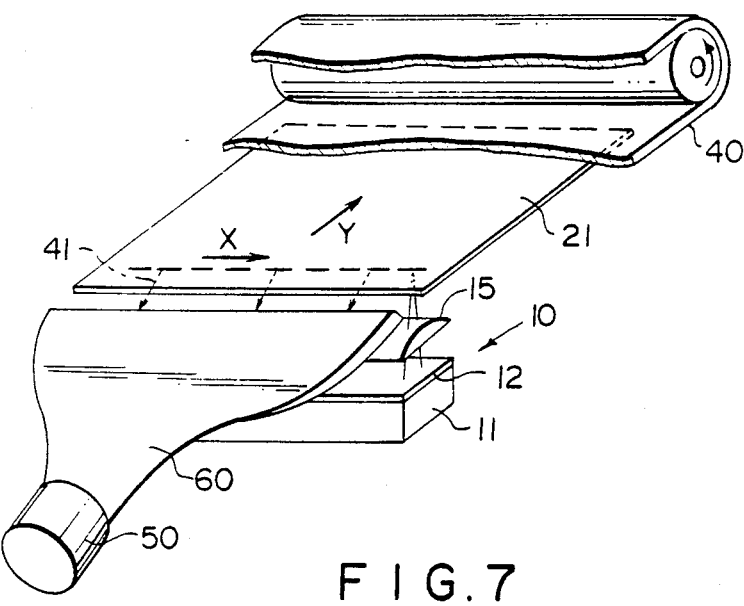
FIG. 6 is a perspective view showing an embodiment of the light beam scanning read-out apparatus in accordance with the present invention.
Figure 7:
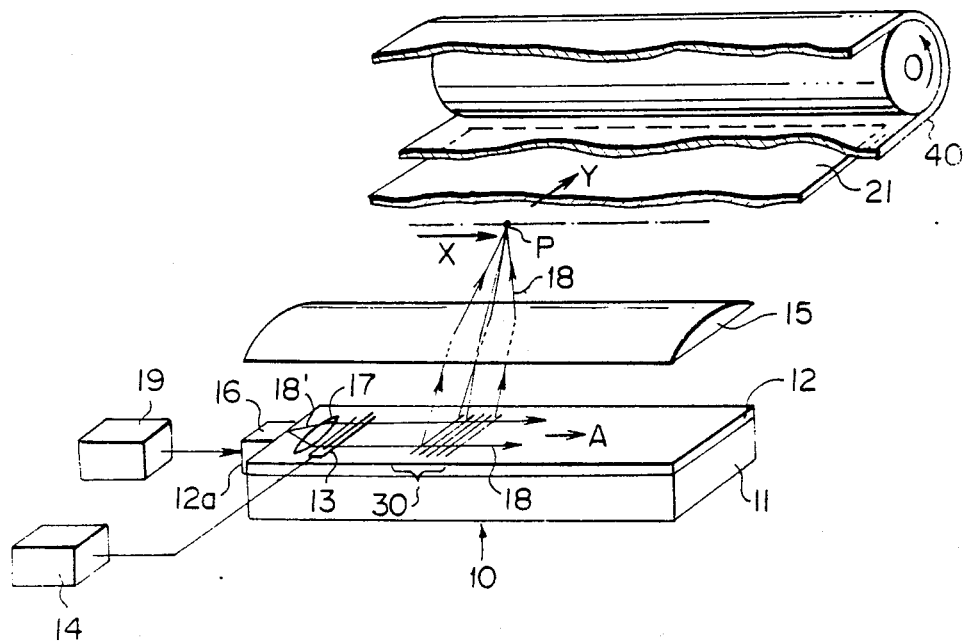
FIG. 7 is a schematic view showing the major part of the embodiment of the light beam scanning read-out apparatus shown in FIG. 6.

FIGS. 6 and 7 show an embodiment of the light beam scanning read-out apparatus in accordance with the present invention. As shown in FIG. 6, the light beam scanning read-out apparatus comprises a light beam scanning section 10, an endless belt device 40 acting as the sub-scanning means, a photomultiplier 50 acting as the photodetector, and a wave guide member 60 connected to the photomultiplier 50. FIG. 7 shows the light beam scanning section 10 by omitting the photomultiplier 50 and the wave guide member 60. The light beam scanning section 10 is constituted in the same manner as described with reference to FIG. 1. The endless belt device 40 is positioned above the cylindrical lens 15 to move a readout original 21 in the direction as indicated by the arrow Y normal to the advance direction of the laser beam 18. In this embodiment, while the scanning in the main scanning direction is conducted as described above, the endless belt device 40 is operated in synchronization with the main scanning, and the original 21 is moved in the sub-scanning direction as indicated by the arrow Y in FIG. 6. As a result, the original 21 is two-dimensionally scanned by the laser beam 18.

The original 21 may, for example, be a stimulable phosphor sheet as disclosed in U.S. Pat. Nos. 4,258,264 and 4,387,428. The stimulable phosphor sheet 21 is exposed in advance to a radiation passing through an object to have a radiation image of the object stored thereon. As shown in FIG. 6 when the stimulable phosphor sheet 21 carrying the radiation image stored thereon is exposed to the laser beam 18, light 41 is emitted by the exposed portion of the stimulable phosphor sheet 21 in proportion to the radiation energy stored. The emitted light 41 is guided inside of the wave guide member 60 and photoelectrically detected by the photomultiplier 50. The output signal of the photomultiplier 50 is processed and sent to an image reproducing apparatus (not shown) for use in reproduction of the radiation image.

The light beam scanning read-out apparatus in accordance with the present invention may also be constituted to scan the original with light, photoelectrically detecting light reflected by the original or light passing through the object, and reading out the original image. Instead of the endless belt device 40, a rotatable drum or the like may be used as the sub-scanning means. The sub-scanning means may also be of the type moving the light scanning section along the surface of the original standing still. In the embodiment of FIG. 6, since the light scanning section is constituted by the simple light beam scanning section including no mechanical operating section, it is possible to move the light beam scanning section easily. Also, the photodetector is not limited to the photomultiplier 50, and may be any known photodetector such as a photodiode array.

Figure 8:
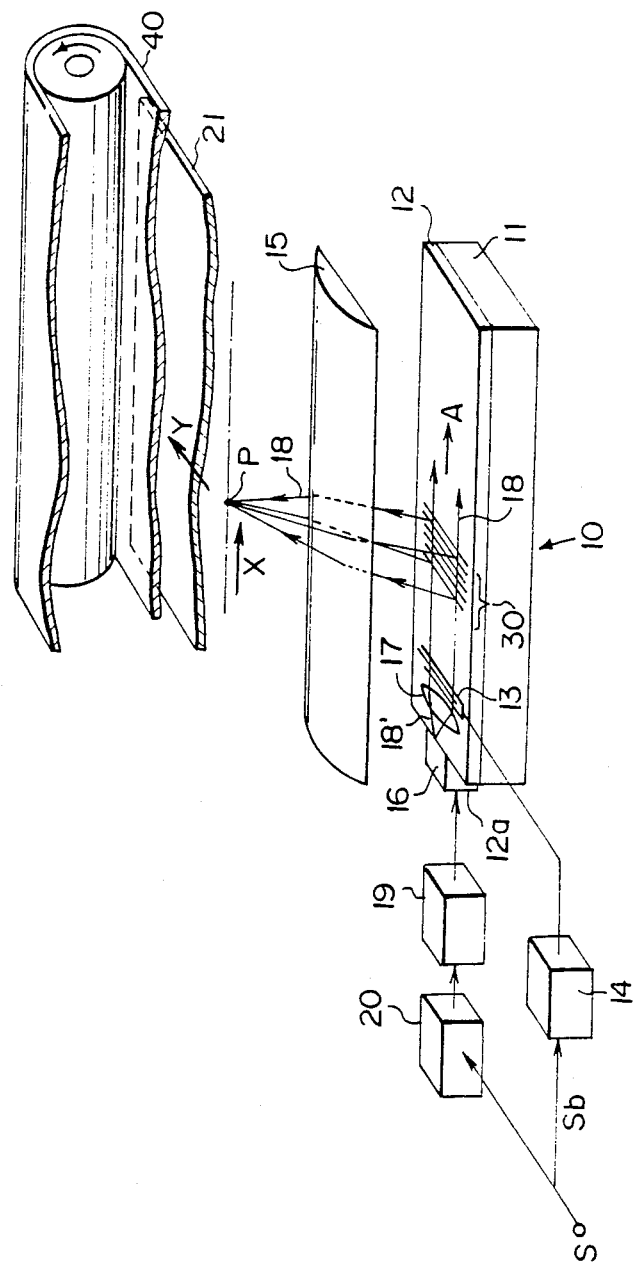
FIG. 8 is a schematic view showing an embodiment of the light beam scanning recording apparatus in accordance with the present invention.

FIG. 8 shows an embodiment of the light beam scanning recording apparatus, wherein the light beam scanning apparatus 10 shown in FIG. 1 is used. In this embodiment, the laser drive circuit 19 for the semiconductor laser 16 is controlled by a modulation circuit 20, and the semiconductor laser 16 is operated so that the laser beam output is changed in accordance with an image signal S. An endless belt device 40 acting as the sub-scanning means is positioned above the cylindrical lens 15 to move a light-sensitive material 21 in the direction as indicated by the arrow Y normal to the advance direction of the laser beam 18 as indicated by the arrow A.

When image recording is conducted on the light-sensitive material 21, the semiconductor laser 16 is operated so that the laser beam output is changed in accordance with the image signal S. At the same time, a predetermined pulsewise voltage is periodically applied by the drive circuit 14 to the inter digital transducer 13. As a result, a grating is obtained by the effects of the surface acoustic waves 30, and the laser beam 18 guided inside of the wave guide 12 is radiated out of the wave guide 12 at the section of the surface acoustic waves 30 and one-dimensionally scans the light-sensitive material 21 in the main scanning direction. Since the laser beam 18 is intensity modulated in accordance with the image signal S, a continuous tone image which the image signal S represents is recorded on one main scanning line by the laser beam 18. At the same time, the endless belt device 40 is operated in synchronization with the scanning with the laser beam 18, and the light-sensitive material 21 is moved in the sub-scanning direction as indicated by the arrow Y. Accordingly, the image which the image signal S represents is recorded in two directions on the light-sensitive material 21.

In order to synchronize the image signal S for one main scanning line with the main scanning with the laser beam 18, the timing of voltage application to the inter digital transducer 13 may be controlled by using a blanking signal Sb included in the image signal S as the trigger signal. It is also possible to synchronize the main scanning with the sub-scanning by controlling the timing of operation of the endless belt device 40 based on the blanking signal Sb.

Instead of directly modulating the semiconductor laser 16 with the image signal S, a laser beam of a predetermined intensity may be emitted by the semiconductor laser 16 and modulated by an external modulator such as an AOM (acousto-optic modulator) or an EOM (electro-optic modulator) positioned between the semiconductor laser 16 and the wave guide 12. The modulation system is not limited to intensity modulation. Thus the laser beam may be emitted pulsewise, and the width or number of the pulses may be modulated in accordance with the image signal S. Further, though a continuous tone image is recorded on the light-sensitive material 21 in the aforesaid embodiment, it is also possible to record a black and white two-valued image by controlling turning on-off of the semiconductor laser 16 in accordance with the image signal.

Further, the endless belt device 40 may be replaced by a rotatable drum or the like. The sub-scanning means may also be of the type moving the light beam scanning section 10 along the surface of the light-sensitive material 21 standing still. In the embodiment of FIG. 8, since the light beam scanning section includes no mechanical operating section, it may be moved easily.

Also, a plurality of the light beam scanning apparatuses may be used to scan a plurality of light beams simultaneously. For example, it is possible to use three units of the light beam scanning apparatus, and to conduct recording or read-out of a color image by combining R, G and B color filters or light sources emitting different color light.

We claim:

1. A light beam scanning apparatus which comprises:
   (i) a wave guide formed of a material allowing propagation of surface acoustic waves therethrough,
   (ii) a means for generating the surface acoustic waves in said wave guide so that they advance along an optical path of light incident upon said wave guide, and
   (iii) a drive circuit for periodically applying a pulsewise voltage to said surface acoustic wave generating means, whereby the wave guided inside of said wave guide is radiated out of said wave guide at the section where said surface acoustic waves are present by a coupling action of a grating generated by said surface acoustic waves with the guided wave.

2. An apparatus as defined in claim 1 wherein said drive circuit is constituted to generate a group of surface acoustic waves of a chirped period.

3. An apparatus as defined in claim 1 wherein said drive circuit is constituted to generate a group of surface acoustic waves of a single period.

4. An apparatus as defined in claim 1, wherein said surface acoustic waves advance in the same direction as the advance direction of the wave in said wave guide.

5. An apparatus as defined in claim 1, wherein said surface acoustic waves advance reversely to the advance direction of the wave in said wave guide.

6. An apparatus as defined in claim 1 wherein a converging optical system for converging the light radiated out of the wave guide is provided.

7. An apparatus as defined in claim 1 wherein an end face of said wave guide opposite to an input face thereof is subjected to a return light generation preventing processing.

8. An apparatus as defined in claim 7 wherein said end face of said wave guide is formed obliquely with respect to said optical path of said guided wave as said return light generation preventing processing.

9. A light beam scanning read-out apparatus which comprises:
   (i) a wave guide formed of a material allowing propagation of surface acoustic waves therethrough,
   (ii) a light source for emitting light into said wave guide, (iii) a means for generating the surface acoustic waves in said wave guide so that they advance along an optical path of the wave inside of said wave guide, (iv) a drive circuit for periodically applying a pulsewise voltage to said surface acoustic wave generating means, (v) a sub-scanning means for moving a read-out original, which is positioned so that the light radiated out of said wave guide by a coupling action of a grating generated by said surface acoustic waves with the wave guided inside of said wave guide impinges upon said read-out original, with respect to said wave guide in a direction approximately normal to the advance direction of said surface acoustic waves, and (vi) a photodetector for photoelectrically detecting light transmitting through said original, light reflected by said original, or light radiated by said original when said light radiated out of said stack impinges upon said original.

10. An apparatus as defined in claim 9 wherein said drive circuit is constituted to generate a group of surface acoustic waves of a chirped period.

11. An apparatus as defined in claim 9 wherein said drive circuit is constituted to generate a group of surface acoustic waves of a single period.

12. An apparatus as defined in claim 9, wherein said surface acoustic waves advance in the same direction as the advance direction of the wave in said wave guide.

13. An apparatus as defined in claim 9, wherein said surface acoustic waves advance reversely to the advance direction of the wave in said wave guide.

14. An apparatus as defined in claim 9 wherein a converging optical system for converging the light radiated out of the wave guide is provided.

15. A light beam scanning recording apparatus which comprises:

(i) a wave guide formed of a material allowing propagation of surface acoustic waves therethrough, (ii) a light source for emitting light into said wave guide, (iii) a means for generating the surface acoustic waves in said wave guide so that they advance along an optical path of the wave inside of said wave guide, (iv) a drive circuit for periodically applying a pulsewise voltage to said surface acoustic wave generating means, (v) a sub-scanning means for moving a light-sensitive material, which is positioned so that the light radiated out of said wave guide by a coupling action of a grating generated by said surface acoustic waves with the wave guided inside of said wave guide impinges upon said light-sensitive material, with respect to said wave guide in direction approximately normal to the advance direction of said surface acoustic waves, and (vi) a modulation means for modulating said light incident upon said wave guide from said light source in accordance with an image signal.

16. An apparatus as defined in claim 15 wherein said drive circuit is constituted to generate a group of surface acoustic waves of a chirped period.

17. An apparatus as defined in claim 15 wherein said drive circuit is constituted to generate a group of surface acoustic waves of a single period.

18. An apparatus as defined in claim 15, wherein said surface acoustic waves advance in the same direction as the advance direction of the wave in said wave guide.

19. An apparatus as defined in claim 15, wherein said surface acoustic waves advance reversely to the advance direction of the wave in said wave guide.

20. An apparatus as defined in claim 15 wherein a converging optical system for converging the light radiated out of the wave guide is provided.

* * * * *